(12) United States Patent
Choi et al.

(10) Patent No.: US 8,128,016 B2
(45) Date of Patent: *Mar. 6, 2012

(54) TORSION BAR SUPPORT STRUCTURE OF SEAT BELT RETRACTOR

(75) Inventors: In-Su Choi, Gyeonggi-do (KR); Jung-Min Lee, Seoul (KR); Byung-Jin Lee, Daegu (KR); Dong-Sub Lee, Gangwon-do (KR); Sang-Hong Bai, Gangwon-do (KR); Gi-Young Bae, Gangwon-do (KR); Jong-Kag Kim, Gangwon-do (KR); Do-Shik Kim, Seoul (KR)

(73) Assignee: Autoliv Development AB, Vargarda (SE)

( * ) Notice: Subject to any disclaimer, the term of this patent is extended or adjusted under 35 U.S.C. 154(b) by 835 days.

This patent is subject to a terminal disclaimer.

(21) Appl. No.: 12/152,663

(22) Filed: May 14, 2008

(65) Prior Publication Data

US 2009/0057468 A1 Mar. 5, 2009

(30) Foreign Application Priority Data

May 18, 2007 (KR) ........................ 10-2007-0048835

(51) Int. Cl.
*B65H 75/48* (2006.01)
(52) U.S. Cl. ..................... 242/374; 242/379.1
(58) Field of Classification Search .................. 242/379, 242/379.1, 376.1, 374, 383.2, 383.5, 383, 242/384.6, 384.5, 384.4, 384.1, 384; 297/470, 297/471, 472, 475, 476, 477, 478; 280/805, 280/806, 807
See application file for complete search history.

(56) References Cited

U.S. PATENT DOCUMENTS 4,244,600 A 1/1981 Takada
(Continued)

FOREIGN PATENT DOCUMENTS

JP 11-222100 8/1999
(Continued)

*Primary Examiner* — Michael Mansen
*Assistant Examiner* — Juan Campos, Jr.
(74) *Attorney, Agent, or Firm* — Brinks Hofer Gilson & Lione

(57) ABSTRACT

Provided is a torsion bar support structure of a seat belt retractor capable of smoothly rotating a rotary torsion bar and preventing deformation of the torsion bar due to moment applied to the torsion bar by coupling support members to both ends of the torsion bar. The torsion bar support structure of a seat belt retractor includes a housing constituting a main body of the seat belt retractor, a guide drum rotatably coupled to the housing, a torsion bar inserted into the guide drum, a base member fixed to one side of the housing, a locking member fixed to the other side of the housing, and a cylinder accommodating a piston therein to rotate a gear member fixed to the base member, the structure including: a bearing member coupled to the gear member, and a cap surrounding a cover fixing shaft projecting from the locking member, wherein the bearing member and the cap rotatably support the torsion bar when rotation moment is applied in a circumferential direction and an axial direction of the torsion bar.
Since a torsion bar is rotatably supported by a bearing member and a cap, the torsion bar can be smoothly rotated by moment applied in an axial direction thereof. In addition, even though axial moment is applied, it is possible to prevent position variation and deformation of the torsion bar. Further, contact resistance between a connector and a projection can be reduced when the torsion bar is rotated, and thus the torsion bar can be smoothly rotated.

16 Claims, 4 Drawing Sheets

U.S. PATENT DOCUMENTS

| | | |
|---|---|---|
| 4,278,216 A | 7/1981 | Takada |
| 4,392,620 A | 7/1983 | Takada |
| 4,401,282 A | 8/1983 | Miki |
| 4,726,540 A | 2/1988 | Ches et al. |
| 4,750,685 A | 6/1988 | Frei |
| 5,071,194 A | 12/1991 | Fohl |
| 5,375,787 A * | 12/1994 | Fujimura et al. ............ 242/384.5 |
| 5,443,224 A | 8/1995 | Patterson et al. |
| 5,495,994 A | 3/1996 | Rumpf et al. |
| 5,568,941 A | 10/1996 | Woydick |
| 5,687,926 A * | 11/1997 | Park et al. .................. 242/383.4 |
| 5,794,876 A | 8/1998 | Morizane et al. |
| 5,826,813 A | 10/1998 | Hibata |
| 5,984,223 A | 11/1999 | Hiramatsu |
| 6,283,398 B1 | 9/2001 | Specht |
| 6,299,093 B1 | 10/2001 | Harte et al. |
| 6,318,662 B1 | 11/2001 | Hori et al. |
| 6,354,528 B1 * | 3/2002 | Nagata et al. ................. 242/374 |
| 6,641,077 B2 | 11/2003 | Hanna et al. |
| 6,698,677 B1 | 3/2004 | Happ et al. |
| 7,290,730 B2 | 11/2007 | Nagata et al. |
| 7,401,815 B2 | 7/2008 | Clute |
| 2001/0004094 A1 | 6/2001 | Hanna et al. |
| 2005/0211816 A1 | 9/2005 | Takamatsu et al. |

FOREIGN PATENT DOCUMENTS

| | | |
|---|---|---|
| JP | 2000-302008 | 10/2000 |
| JP | 2000-309249 | 11/2000 |
| JP | 2003-212086 | 7/2003 |
| JP | 2003-341473 | 12/2003 |
| JP | 2006-213112 | 8/2006 |

* cited by examiner

TORSION BAR SUPPORT STRUCTURE OF SEAT BELT RETRACTOR

CROSS-REFERENCE TO RELATED APPLICATION

This application claims the benefit of Korean Patent Application No. 2007-0048835, filed May 18, 2007, the disclosure of which is hereby incorporated herein by reference in its entirety.

BACKGROUND OF THE INVENTION

1. Field of the Invention

The present invention relates to a torsion bar support structure of a seat belt retractor, and more particularly, to a torsion bar support structure of a seat belt retractor capable of stably supporting the torsion bar inserted into a guide drum of the seat belt retractor to smoothly release or rewind a webbing.

2. Description of the Prior Art

A seat belt or an airbag is installed in a vehicle to safely protect a driver and a passenger from traffic accidents. Such a seat belt is a basic safety device installed to operate upon vehicle accidents such as front collision, side collision, roll, and so on, to thereby maximally protect a driver and a passenger.

A widely used seat belt is a three-point safety belt constituted of a waist belt for protecting the waist of the passenger (hereinafter, including "driver"), and a shoulder belt for protecting the shoulder and the breast. A guide pulley is coupled with the shoulder belt, a retractor is installed at a center pillar of a vehicle to release or wind the belt, and the waist belt is fastened to a locker panel.

In addition, a tongue is inserted in a mid-portion of the belt, and the tongue can be locked to or released from a buckle fixed to a floor of the vehicle.

Further, the retractor for winding or releasing the seat belt is classified into a non-locking retractor (NLR), an emergency locking retractor (ELR), and a web locking retractor (WLR).

The non-locking retractor is locked after adjusting lengths of the shoulder belt and the waist belt. On the other hand, in the emergency locking retractor, the belt is freely retracted and rewound during stoppage or movement of the vehicle, and the belt is locked only when a vehicle collision causing abrupt deceleration occurs or when the belt is rapidly extracted.

In addition, in the web locking retractor, a clamp directly grips the belt upon vehicle collision to stop extraction of the belt, thereby preventing serious injury to the passenger due to abrupt forward movement of the passenger.

Meanwhile, Japanese Patent Laid-open Publication No. H11-222100 discloses a "Safety belt retractor", which will be briefly described below.

The safety belt retractor includes a winding drum for winding a webbing, and a spindle shaft acting as a torsion bar having one end engaged with the winding drum in a non-rotatable manner, which absorbs energy using distortion of the spindle shaft upon vehicle emergency. The safety belt retractor allows distortion of the spindle shaft until a distortion rotation amount of one end of the spindle shaft relative to the other end proximity part arrives at a predetermined value upon vehicle emergency. In addition, the safety belt retractor includes a fastening mechanism for fastening the winding drum to the other end proximity part of the spindle shaft in a non-rotatable manner when the distortion rotation amount arrives at the predetermined value.

Meanwhile, Japanese Patent Laid-open Publication No. 2000-302008 discloses a "Webbing Winding Apparatus", which will be briefly described below.

The webbing winding apparatus includes a frame having a pair of rectangular plates opposite to each other, and a winding shaft, to which one end of an elongated strip shape of webbing belt is fixed to restrain a passenger, for biasing the webbing belt in a winding direction, and supported at both sides of a portion of the fastened webbing belt by the pair of rectangular plates in an axial direction.

In addition, the webbing winding apparatus has a fixing part fixed to a vehicle body and connecting the respective lateral ends of the pair of rectangular plates. In addition, a connection part having a plurality of hexagonal parts is installed at the frame. The plurality of hexagonal parts have empty parts or thin parts, respectively, such that the plurality of hexagonal parts are continuously or intermittently arranged in a tension direction applied between the winding shaft and the pair of rectangular plates when the webbing belt is extracted, and simultaneously aligned parallel to each other depending on the tension direction.

Although the webbing winding apparatus has advantages in that uniform tension is applied to the frame connection part in the tension direction when the webbing belt is extracted and elastic deformation of the connection part is uniformized, since load of the webbing winding apparatus is applied to a torsion bar for supporting a spool rotatably installed between the respective plates, the torsion bar may be deformed and the webbing winding apparatus may not be smoothly rotated when the webbing is released or rewound.

In addition, Japanese Patent Laid-open Publication No. 2000-309249 discloses a "Safety Belt Retractor", which will be briefly described below.

The safety belt retractor includes a spool rotatably biased in one direction to wind a webbing, a ratchet wheel rotated with the spool, and an emergency lock mechanism meshed with the ratchet wheel in response to emergency detection by an inertia detection means and having a Hermann Paul pawl for locking the spool using the corresponding ratchet wheel.

In addition, a torsion bar is installed between the spool and the ratchet wheel. One end of the torsion bar is coupled to the spool, and the other end of the torsion bar is coupled to the ratchet wheel. Therefore, the torsion bar is twisted when the webbing extraction force is applied during operation of the emergency lock mechanism, thereby absorbing impact.

Further, the torsion bar has a polygonal coupling part coupled to the ratchet wheel, and the ratchet wheel has a polygonal fastening hole to which the polygonal coupling part is fastened. A rib-shaped projection is formed at an inner surface of the polygonal fastening hole in an axial direction of the torsion bar to thereby bias the torsion into the fastening hole in a direction that the torsion bar is rotated during extraction of the webbing, in order to press fit the surfaces of the torsion bar and the ratchet wheel to each other in the direction that the torsion bar is rotated.

Although the seat belt retractor has an advantage in that there is no assembly error since the torsion bar and the ratchet wheel are assembled at a predetermined angle, because both ends of the torsion bar have a polygonal shape it is difficult to manufacture the torsion bar, and thus manufacturing cost may increase. In addition, since there is no support member for supporting the both ends of the torsion bar, the torsion bar cannot be smoothly rotated, and weight of the retractor and rotation moment of the torsion bar may be applied to the both ends of the torsion bar to thereby deform the torsion bar.

In addition, Japanese Patent Laid-open Publication No. 2003-341473 discloses a "Seat Belt Retractor", which will be briefly described below.

The seat belt retractor includes a winding drum on which a webbing is wound, a torsion bar inserted into the winding drum and coupled to one end of the winding drum at its one end in a non-relative rotation manner and simultaneously biased in a webbing winding direction, and an emergency lock mechanism operated in an emergency and stopping rotation of the other end of the torsion bar in the webbing extraction direction.

In addition, the seat belt retractor includes a winding part adjacent to the other end of the winding drum, a plate coupled to the other end of the torsion bar in a non-relative rotation manner, and a wire coupled to the plate at its one end and disposed along a curved path installed at the middle part of the other end surface of the winding drum.

Further, in a vehicle emergency, when an extraction force more than a predetermined value is applied to the webbing after operation of the emergency lock mechanism, the torsion bar absorbs distortion and impact energy due to extraction resistance of the wire from the curved path by relative rotation between the plate and the winding drum.

The wire is extracted from the curved path by the relative rotation between the plate and the winding drum, and an outer diameter of the winding part of the plate, on which the wire is wound, is twisted to reduce extraction resistance of the wire being gradually varied from a start time.

Although the seat belt retractor has an advantage in that the wire absorbs distortion of the torsion bar, since there is no support member for fixing both ends of the torsion bar, the torsion bar cannot be smoothly rotated. In addition, since the weight of the retractor and the rotation moment of the torsion bar cause deformation of the torsion bar and the retractor is assembled from a plurality of heavy weight metal parts, its manufacturing cost may increase.

In addition, Japanese Patent Laid-open Publication No. 2006-213112 discloses a "Pretensioner Apparatus". In the pretensioner device, a pinion with teeth has a first protrusion protruding to the other side of a cam part in a peripheral direction thereof, and a meshing claw of a clutch plate has a second protrusion formed so that one circumferential cross-section of the cam part opposes the first protrusion.

As described above, the conventional metal parts are assembled to increase the weight of the seat belt retractor, but without any support member for supporting both ends of the torsion bar the retractor is deformed due to friction of the metal parts and the weight thereof, thus making it difficult to assemble the retractor. ("much time" is repeated unnecessarily here and in the next paragraph)

In addition, assembly of the seat belt retractor requires much assembly time, thereby decreasing assembly efficiency. Further, complexity of the parts constituting the seat belt retractor makes it difficult to manufacture the seat belt retractor, thereby increasing manufacturing cost. Furthermore, when the webbing of the seat belt retractor is to be rewound it may not successfully operate, and a passenger may misconceive that the seat belt could be out of order.

SUMMARY OF THE INVENTION

An object of the present invention is to provide a torsion bar support structure of a seat belt retractor capable of smoothly rotating a rotary torsion bar and preventing deformation of the torsion bar due to moment applied to the torsion bar by coupling support members to both ends of the torsion bar.

An aspect of the invention provides a torsion bar support structure of a seat belt retractor including a housing constituting a main body of the seat belt retractor, a guide drum rotatably coupled to the housing, a torsion bar inserted into the guide drum, a base member fixed to one side of the housing, a locking member fixed to the other side of the housing, and a cylinder accommodating a piston therein to rotate a gear member fixed to the base member, the structure further comprising: a bearing member coupled to the gear member, wherein the locking member has a cover fixing shaft projecting from one end thereof and a cap is coupled to the end of the cover fixing shaft, and one end of the torsion bar is supported by the bearing member when an axial moment is applied to the torsion bar and the other end of the torsion bar is supported by the cap through the medium of the locking member.

In one embodiment, the gear member may be formed of a circular plate and may include a pinion gear projecting from one side surface of the circular plate and a slant gear projecting from the other side surface of the circular plate. The slant gear may have a bearing insertion groove formed at its central part and into which the bearing member is inserted.

In another embodiment, the cap may have an insertion groove into which the cover fixing shaft of the locking member is inserted, and a first projection fixedly inserted into a groove formed at an inner center of a mechanism cover fixed to one side of the locking member.

In still another embodiment, the locking member may include a locking base installed at one side of the guide drum, a locking clutch fixed to one side of the locking base, and a locker arm coupled to one side of the locking clutch, wherein the cover fixing shaft is formed at one side of the locking base.

In yet another embodiment, the torsion bar support structure of a seat belt retractor may further include a connector having a roller engagement part and a torsion bar coupling pipe extending toward one side of the roller engagement part to be fixed to the torsion bar, wherein the base member includes clutch rollers installed therein, and the clutch rollers are meshed with an internal gear formed at an inner periphery of the roller engagement part.

In yet another embodiment, the base member may include a roller retainer projecting from one side surface of a flange formed around an inner center diameter thereof, and a projection projecting from a surface of the roller retainer. The projection may be in close contact with an inner surface of the roller engagement part to support the torsion bar in its axial direction.

In yet another embodiment, the bearing member and the cap may be formed of a synthetic resin material.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF EXEMPLARY EMBODIMENTS

Hereinafter, exemplary embodiments of the present invention will be described with reference to the accompanying drawings.

Figure 1:
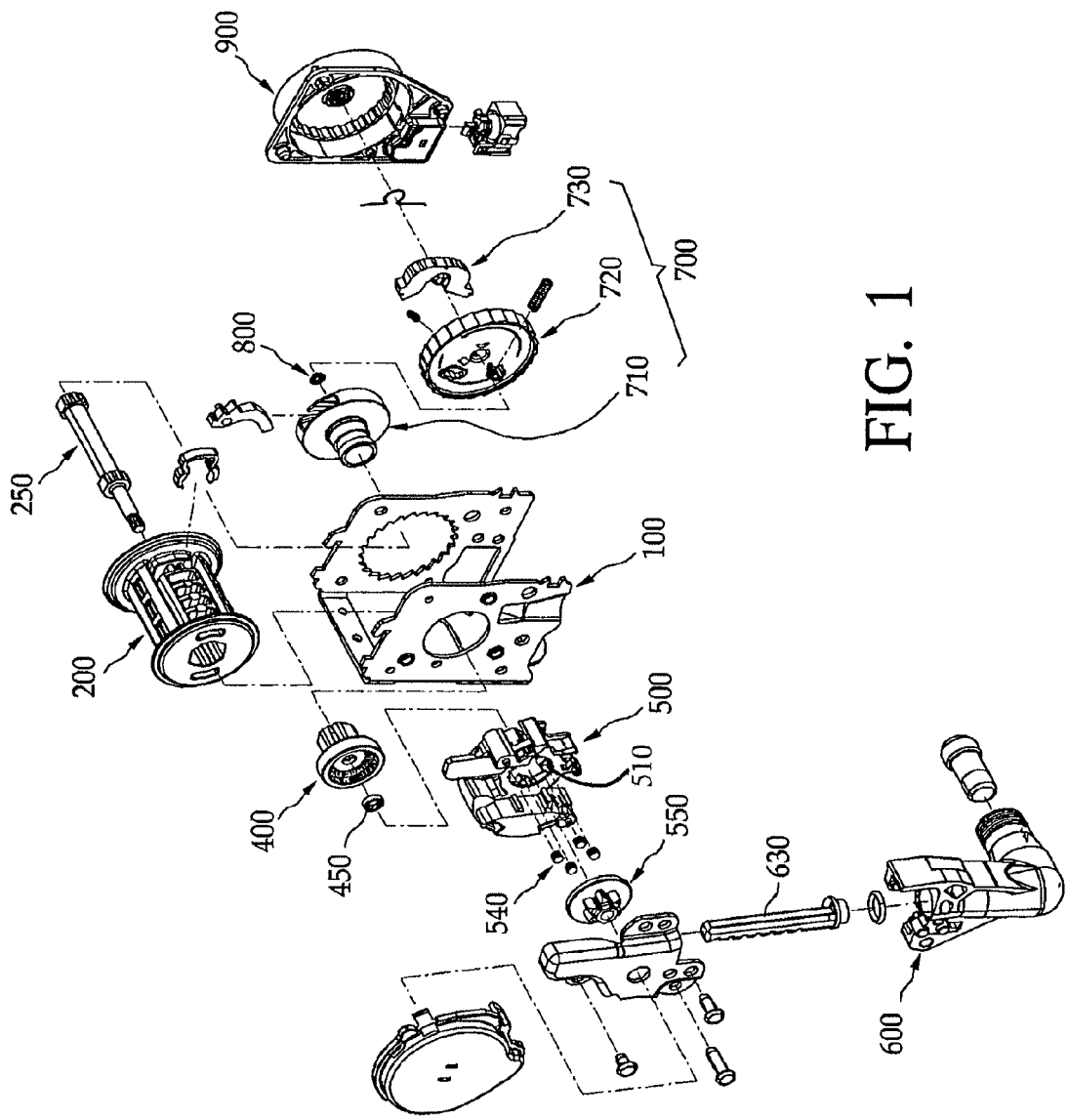
FIG. 1 is an exploded perspective view of a seat belt retractor in accordance with an exemplary embodiment of the present invention.
Figure 2:
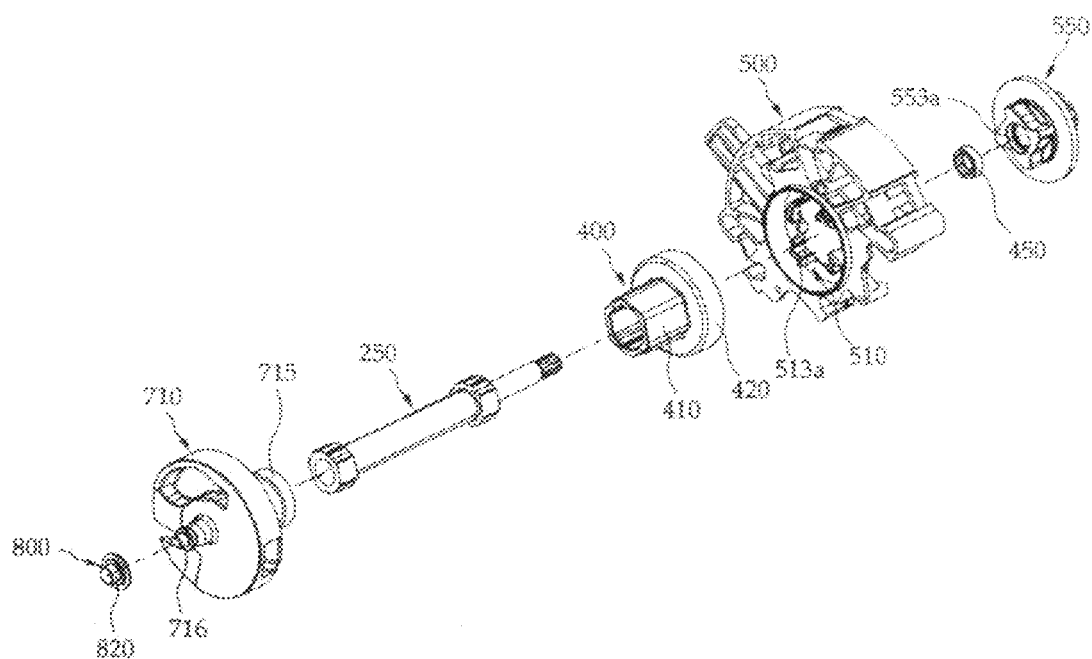
FIG. 2 is an exploded perspective view of a torsion bar support structure in accordance with an exemplary embodiment of the present invention.
Figure 3:
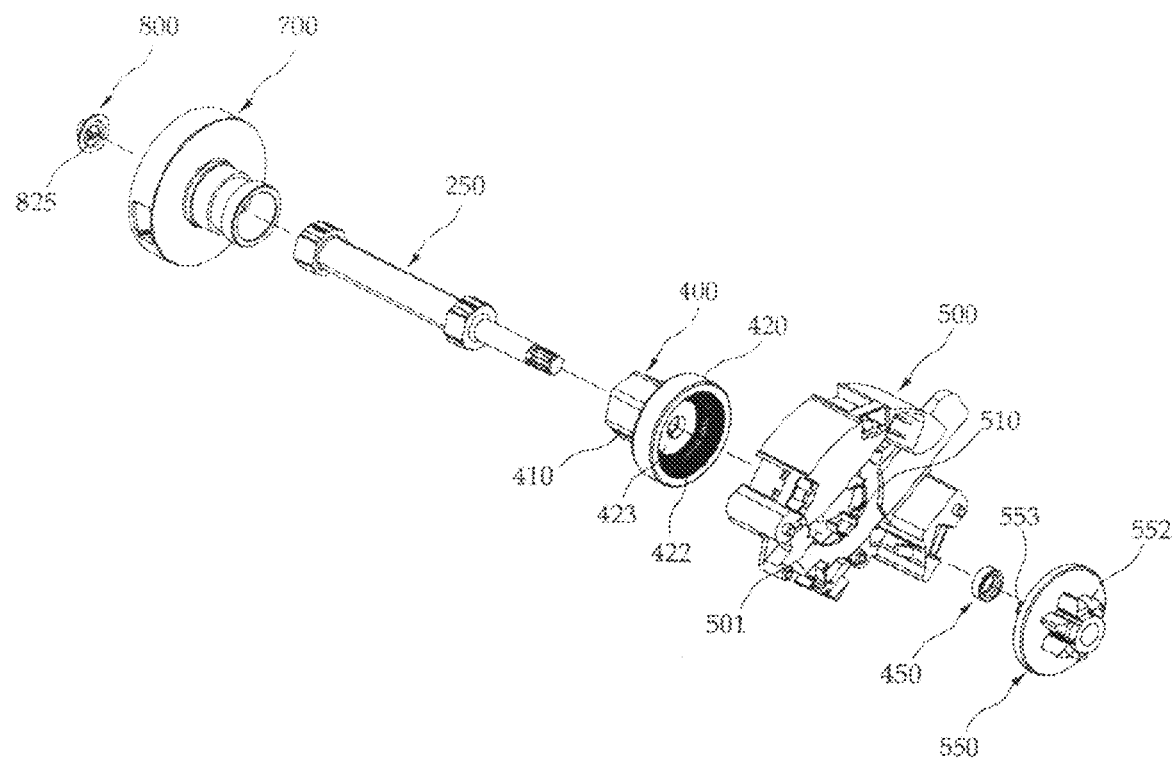
FIG. 3 is an exploded perspective view of the torsion bar support structure in accordance with an exemplary embodiment of the present invention.
Figure 4:
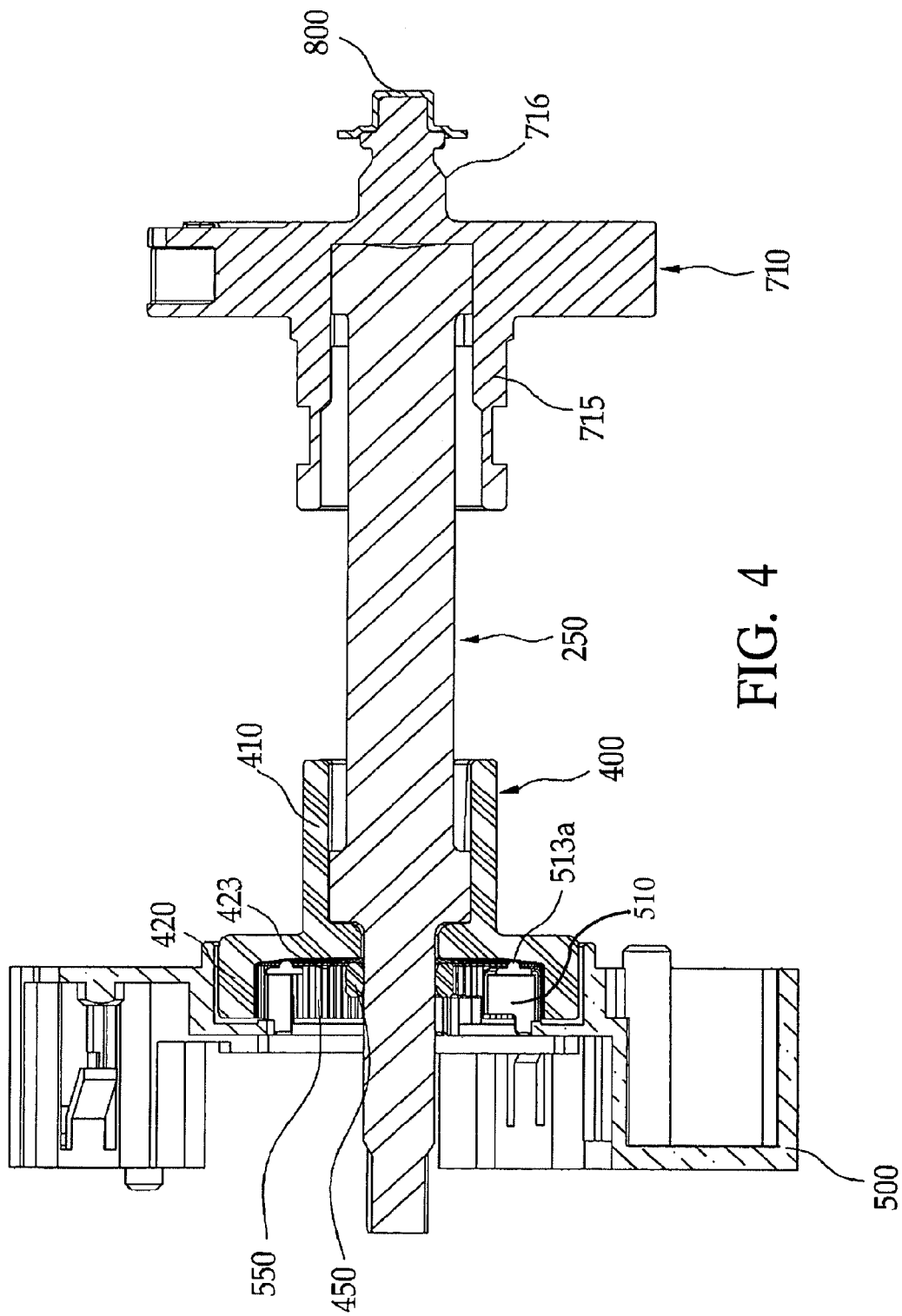
FIG. 4 is a cross-sectional view of the torsion bar support structure in accordance with an exemplary embodiment of the present invention.

FIG. 1 is an exploded perspective view of a seat belt retractor in accordance with an exemplary embodiment of the present invention, FIG. 2 is an exploded perspective view of a torsion bar support structure in accordance with an exemplary embodiment of the present invention, FIG. 3 is an exploded perspective view of the torsion bar support structure in accordance with an exemplary embodiment of the present invention, and FIG. 4 is a cross-sectional view of the torsion bar support structure in accordance with an exemplary embodiment of the present invention.

As shown in FIGS. 1 to 4, the torsion bar support structure of a seat belt retractor in accordance with the present invention includes a housing 100 constituting a main body of the seat belt retractor, a guide drum 200 rotatably coupled to the housing 100, and a torsion bar 250 inserted into the guide drum 200.

In addition, the torsion bar support structure of a seat belt retractor in accordance with the present invention includes a base member 500 fixed to one side of the housing 100, a locking member 700 fixed to the other side of the housing 100, a bearing member 450 installed to one side of the torsion bar 250, a cap 800 installed at one side of the locking member 700, and a mechanism cover 900 fixed to a tip of the torsion bar 250.

A webbing for restraining a passenger is wound on the guide drum 200, and the torsion bar is inserted into a center of the guide drum 200. The torsion bar 250 is rotated with the guide drum 200, and plastically deformed by distortion and rotation moment applied to the guide drum 200 in a state that the webbing is restrained, thereby absorbing energy applied to the seat belt retractor.

The torsion bar 250 is longer than the guide drum 200. The connector 400 is installed at one side of the torsion bar, and the locking member 700 is installed at the other side thereof.

The connector 400 includes a torsion bar coupling pipe 410 inserted into the torsion bar 250, and a roller engagement part 420 extending from the torsion bar coupling pipe 410.

The connector 400 is disposed at one side of the guide drum 200 to be rotated with the torsion bar 250.

The locking member 700 includes a locking base 710 installed at one side of the guide drum 200, a locking clutch 720 fixed to one side of the locking base 710, and a locker arm 730 coupled to one side of the locking clutch 720.

In addition, the torsion bar coupling pipe 410 is inserted into one side of the torsion bar 250, and the roller engagement part 420 is installed to surround clutch rollers 540 engaged with the base member 500.

Specifically, the roller engagement part 420 has an internal gear 422 formed at its inner periphery. The internal gear 422 has a diameter larger than that of the torsion bar coupling pipe 410 to form a vertical inner surface 423 between the torsion bar coupling pipe 410 and the internal gear 422.

In addition, the clutch roller 540 coupled to the base member 500 has teeth formed at its outer surface, and the base member 500 has a roller retainer 510 to stably fix the clutch roller 540.

The roller retainer 510 is formed to project from one surface thereof along an inner center diameter of the base member 500, and has projections 513a projecting from its surface to form a semi-spherical shape. The projections 513a is in close contact with an inner surface 423 of the connector 400.

In addition, the base member 500 is engaged with a gear member 550 to rotate the clutch rollers 540. The gear member 550 includes a pinion gear 552 projecting from one side surface of a circular plate, and a slant gear 553 formed at the other side surface and in contact with the clutch rollers 540.

The torsion bar 250 passes through the gear member 550, and a bearing insertion groove 553a is formed at an central part of the slant gear to insert a bearing member 450.

Specifically, the bearing member 450 is fixedly inserted into the bearing insertion groove 553a such that the torsion bar 250 is rotatably engaged therewith. Since the bearing member 450 is disposed between the torsion bar 250 and the gear member 550, the bearing member 450 may be formed of a synthetic resin material in order to prevent noise during rotation of the torsion bar 250 and wearing due to friction thereof.

In addition, a cylinder 600 having a piston 630 therein is installed at the gear member 550 to raise the piston 630 and rotate the pinion gear 552 meshed with the piston 630.

Further, the locking member 700 is installed to the other side of the guide drum 200 to stop rotation of the guide drum 200, and the locking base 710 is inserted into the guide drum 200.

The locking base 710 and the locking clutch 720 are rotated with the guide drum 200. When the guide drum 200 is abruptly operated, a pawl coupled to the locking base 710 is hooked by a latch of the housing 100 to stop rotation of the guide drum 200.

In addition, the locking base 710 includes a drum fixing shaft 715 disposed at one side thereof and inserted into the guide drum 200, and a cover fixing shaft 716 disposed at the other side and coupled to the mechanism cover 900.

The cap 800 formed of a synthetic resin material is capped onto the cover fixing shaft 716. The cap 800 has a first projection 820 formed at one side thereof and rotatably inserted into a groove of the mechanism cover 900, and an insertion groove 825 formed at a surface opposite to the first projection 820 and fixed to the cover fixing shaft 716.

Therefore, the torsion bar support structure of a seat belt retractor in accordance with the present invention can allow a passenger to pull the webbing so that the webbing is released or rewound.

The guide drum 200 and the torsion bar 250 are rotated during normal operation of releasing or rewinding the webbing. At this time, both ends of the torsion bar 150 are supported and rotated by the gear member 550 and the locking member 700 installed to both sides of the housing 100.

The torsion bar 250 can be smoothly rotated by the bearing member 450 installed at the gear member 550 and the cap 800 installed at the locking base 710.

Specifically, the bearing member 450 is inserted between the torsion bar 250 and the gear member 550 such that they can be rotated without friction and wearing. The cap 800 is inserted between the locking base 710 and the mechanism cover 900 such that they can be rotated without friction and wearing, thereby smoothly rotating the torsion bar 250.

In addition, when the webbing is abruptly pulled to be fixed in a tensed state, that is, in a state that release of the webbing is stopped, strong tension is applied to the webbing, and the tension is transmitted to the rotary bodies, i.e., the guide drum 200 and the torsion bar 250.

At this time, since the guide drum 200 is fixed to the housing 100, the torque is transmitted to the guide drum 200, and the torsion bar 250 receives the tension force of the webbing to receive rotational displacement and torque.

Therefore, although the torsion bar 250 maintains an initial installation state due to its own strength, without deformation by the torque, when a stronger torque than the strength of the torsion bar 250 is applied to the torsion bar 250, the torsion bar 250 may be plastically deformed.

Although the torsion bar 250 is plastically deformed, the torsion bar 250 has to maintain the initial installation state. Therefore, one end of the torsion bar 250 should be rotated while maintaining the installation state by the bearing member 450 fixed to the gear member 550.

In addition, since the other end of the torsion bar 250 is fixed to the locking base 710 and rotated therewith, the torsion bar 250 may be plastically deformed in place without position variation.

At this time, rotation moment applied to the torsion bar 250 is applied on the line passing through the bearing member 450 and the cap 800 to prevent deformation of the torsion bar 250.

In addition, the projection 513a of the base member 500 is in contact with the inner surface 423 of the connector 400, and the torsion bar 250 can be smoothly rotated by the moment applied in an axial direction thereof.

As can be seen from the foregoing, since a torsion bar is rotatably supported by a bearing member and a cap, the torsion bar can be smoothly rotated by moment applied in an axial direction thereof. In addition, even though axial moment is applied, it is possible to prevent position variation and deformation of the torsion bar. Further, contact resistance between a connector and a projection can be reduced when the torsion bar is rotated, and thus the torsion bar can be smoothly rotated.

Although this invention has been described with reference to exemplary embodiments thereof, it will be clear to those of ordinary skill in the art to which the invention pertains that various modifications may be made to the described embodiments without departing from the spirit and scope of the invention as defined in the appended claims and their equivalents.

What is claimed is:

1. A torsion bar support structure of a seat belt retractor comprising a housing constituting a main body of the seat belt retractor, a guide drum rotatably coupled to the housing, a torsion bar inserted into the guide drum, a base member fixed to one side of the housing, a locking member installed to the other side of the housing, and a cylinder accommodating a piston therein to rotate a gear member connected to the base member, the structure further comprising:
   a bearing member coupled to the gear member,
   wherein the locking member has a cover fixing shaft projecting from one end thereof, and a cap provided on the end of the cover fixing shaft,
   one end of the torsion bar is supported by the bearing member and another end of the torsion bar is supported by the cap through the medium of the locking member, and
   a connector having a roller engagement part and a torsion bar coupling pipe extending toward one side of the roller engagement part to be fixed to the torsion bar,
   wherein the base member comprises clutch rollers installed therein, and the clutch rollers are meshed with an internal gear formed at an inner periphery of the roller engagement part.

2. The torsion bar support structure of a seat belt retractor according to claim 1, wherein the gear member is formed of a circular plate, and has a pinion gear projecting from one side surface of the circular plate and a slant gear projecting from the other side surface of the circular plate,
   wherein the slant gear has a bearing insertion groove formed at a central part thereof and into which the bearing member is inserted.

3. The torsion bar support structure of a seat belt retractor according to claim 1, wherein the cap has an insertion groove into which the cover fixing shaft is inserted, and a first projection rotatably inserted into a groove formed at an inner center of a mechanism cover coupled to one side of the locking member.

4. The torsion bar support structure of a seat belt retractor according to claim 3, wherein the locking member comprises a locking base installed at one side of the guide drum, a locking clutch fixed to one side of the locking base, and a locker arm coupled to one side of the locking clutch, wherein the cover fixing shaft is formed at one side of the locking base.

5. The torsion bar support structure of a seat belt retractor according to claim 1, wherein the base member comprises a roller retainer projecting from one side surface thereof along formed around an inner center diameter of the base member, and a projection projecting from a surface of the roller retainer,
   wherein the projection is in close contact with an inner surface of the roller engagement part to support the torsion bar in an axial direction of the torsion bar.

6. The torsion bar support structure of a seat belt retractor according to claim 5, wherein the bearing member and the cap are formed of a synthetic resin material.

7. A torsion bar support structure of a seat belt retractor comprising a housing constituting a main body of the seat belt retractor, a guide drum rotatably coupled to the housing, a torsion bar inserted into the guide drum, a base member fixed to one side of the housing, a locking member installed to the other side of the housing, and a cylinder accommodating a piston therein to rotate a gear member connected to the base member, the structure further comprising:
   a bearing member coupled to the gear member,
   wherein the locking member has a cover fixing shaft projecting from one end thereof, and a cap provided on the end of the cover fixing shaft,
   one end of the torsion bar is supported by the bearing member and another end of the torsion bar is supported by the cap through the medium of the locking member,
   wherein the cap has an insertion groove into which the cover fixing shaft is inserted, and a first projection rotatably inserted into a groove formed at an inner center of a mechanism cover coupled to one side of the locking member, and
   wherein the locking member comprises a locking base installed at one side of the guide drum, a locking clutch fixed to one side of the locking base, and a locker arm coupled to one side of the locking clutch, wherein the cover fixing shaft is formed at one side of the locking base,
   a connector having a roller engagement part and a torsion bar coupling pipe extending toward one side of the roller engagement part to be fixed to the torsion bar,
   wherein the base member comprises clutch rollers installed therein, and the clutch rollers are meshed with an internal gear formed at an inner periphery of the roller engagement part.

8. The torsion bar support structure of a seat belt retractor according to claim 7, wherein the gear member is formed of a circular plate, and has a pinion gear projecting from one side surface of the circular plate and a slant gear projecting from the other side surface of the circular plate, wherein the slant gear has a bearing insertion groove formed at a central part thereof and into which the bearing member is inserted.

9. The torsion bar support structure of a seat belt retractor according to claim 7, wherein the base member comprises a roller retainer projecting from one side surface thereof along an inner center diameter of the base member, and a projection projecting from a surface of the roller retainer, wherein the projection is in close contact with an inner surface of the roller engagement part to support the torsion bar in an axial direction of the torsion bar.

10. The torsion bar support structure of a seat belt retractor according to claim 9, wherein the bearing member and the cap are formed of a synthetic resin material.

11. A torsion bar support structure of a seat belt retractor comprising a housing constituting a main body of the seat belt retractor, a guide drum rotatably coupled to the housing, a torsion bar inserted into the guide drum, a base member fixed to one side of the housing, a locking member installed to the other side of the housing, and a cylinder accommodating a piston therein to rotate a gear member connected to the base member, the structure further comprising:

a bearing member coupled to the gear member, wherein the locking member has a cover fixing shaft projecting from one end thereof, and a cap provided the end of the cover fixing shaft, one end of the torsion bar is supported by the bearing member and another end of the torsion bar is supported by the cap through the medium of the locking member, and a connector having a roller engagement part and a torsion bar coupling pipe extending toward one side of the roller engagement part to be fixed to the torsion bar, wherein the base member comprises clutch rollers installed therein, and the clutch rollers are meshed with an internal gear formed at an inner periphery of the roller engagement part.

12. The torsion bar support structure of a seat belt retractor according to claim 11, wherein the base member comprises a roller retainer projecting from one side surface thereof along an inner center diameter of the base member, and a projection projecting from a surface of the roller retainer, wherein the projection is in close contact with an inner surface of the roller engagement part to support the torsion bar in an axial direction of the torsion bar.

13. The torsion bar support structure of a seat belt retractor according to claim 12, wherein the bearing member and the cap are formed of a synthetic resin material.

14. The torsion bar support structure of a seat belt retractor according to claim 11, wherein the gear member is formed of a circular plate, and has a pinion gear projecting from one side surface of the circular plate and a slant gear projecting from the other side surface of the circular plate, wherein the slant gear has a bearing insertion groove formed at a central part thereof and into which the bearing member is inserted.

15. The torsion bar support structure of a seat belt retractor according to claim 11, wherein the cap has an insertion groove into which the cover fixing shaft is inserted, and a first projection rotatably inserted into a groove formed at an inner center of a mechanism cover coupled to one side of the locking member.

16. The torsion bar support structure of a seat belt retractor according to claim 15, wherein the locking member comprises a locking base installed at one side of the guide drum, a locking clutch fixed to one side of the locking base, and a locker arm coupled to one side of the locking clutch, wherein the cover fixing shaft is formed at one side of the locking base.

* * * * *

UNITED STATES PATENT AND TRADEMARK OFFICE
CERTIFICATE OF CORRECTION

PATENT NO. : 8,128,016 B2
APPLICATION NO. : 12/152663
DATED : March 6, 2012
INVENTOR(S) : In-Su Choi et al.

Page 1 of 1

It is certified that error appears in the above-identified patent and that said Letters Patent is hereby corrected as shown below:

<u>In the Claims</u>

In column 8, claim 5, line 23, before "around an inner center diameter" delete "formed".

In column 9, claim 11, line 17, after "of a seat belt" replace "refractor" with --retractor--.

Signed and Sealed this
Eighth Day of May, 2012

David J. Kappos
*Director of the United States Patent and Trademark Office*